US011587549B2

(12) United States Patent
Finlay et al.

(10) Patent No.: US 11,587,549 B2
(45) **Date of Patent: *Feb. 21, 2023**

(54) SYSTEM AND METHOD FOR COMBINING PHONETIC AND AUTOMATIC SPEECH RECOGNITION SEARCH

(71) Applicant: Nice Ltd., Ra'anana (IL)

(72) Inventors: William Mark Finlay, Tucker, GA (US); Robert William Morris, Decatur, GA (US); Peter S. Cardillo, Atlanta, GA (US); Maria Kunin, San Rafael, CA (US)

(73) Assignee: Nice Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,910

(22) Filed: Jul. 28, 2022

(65) Prior Publication Data

US 2022/0366891 A1 Nov. 17, 2022

Related U.S. Application Data

(63) Continuation of application No. 16/550,700, filed on Aug. 26, 2019, now Pat. No. 11,443,734.

(51) Int. Cl.

*G10L 15/02* (2006.01)
*G10L 15/08* (2006.01)

(52) U.S. Cl.

CPC .............. *G10L 15/02* (2013.01); *G10L 15/08* (2013.01); *G10L 2015/025* (2013.01)

(58) Field of Classification Search

None

See application file for complete search history.

(56) References Cited

U.S. PATENT DOCUMENTS 7,263,484 B1 8/2007 Cardillo et al.
7,324,939 B1 1/2008 Cardillo et al.
7,487,086 B2 2/2009 Griggs
7,949,527 B2 5/2011 Arrowood et al.
8,719,022 B2 5/2014 Arrowood et al.
9,201,905 B1 12/2015 Kelsey et al.
9,361,879 B2 6/2016 Morris et al.
10,019,514 B2 7/2018 Elisha et al.
10,269,352 B2 4/2019 Morris et al.
10,706,843 B1 7/2020 Elangovan et al.
2002/0052870 A1 5/2002 Charlesworth et al.

(Continued)

*Primary Examiner* — Anne L Thomas-Homescu

(74) *Attorney, Agent, or Firm* — Pearl Cohen Zedek Latzer Baratz LLP

(57) ABSTRACT

A text search query including one or more words may be received. An ASR index created for an audio recording may be searched over using the query to produce ASR search results including words, each word associated with a confidence score. For each of the words in the ASR search results associated with a confidence score below a threshold (and in some cases having one or more preceding words in the ASR index and one or more subsequent words in the ASR index), a phonetic representation of the audio recording may be searched for the word having the confidence score below the threshold, where it occurs in the audio recording, possibly after the one or more preceding words and in the audio recording before the one or more subsequent words, to produce phonetic search results. Search results may be returned include ASR and phonetic results.

20 Claims, 7 Drawing Sheets

(56) References Cited

U.S. PATENT DOCUMENTS

2003/0120486 A1 6/2003 Brittan et al.
2004/0210443 A1 10/2004 Kuhn et al.
2005/0240768 A1 10/2005 Lemma et al.
2005/0289463 A1 12/2005 Wu et al.
2006/0111902 A1 5/2006 Julia et al.
2006/0217966 A1 9/2006 Hu et al.
2006/0293889 A1 12/2006 Kiss et al.
2007/0036290 A1* 2/2007 Gasparri ............. H04M 1/6016 379/88.12
2007/0096896 A1 5/2007 Zingelewicz et al.
2007/0129945 A1 6/2007 Ma et al.
2007/0271241 A1 11/2007 Morris et al.
2008/0270129 A1 10/2008 Colibro et al.
2008/0270138 A1* 10/2008 Knight .................. G06F 16/434 704/E15.045
2009/0024046 A1 1/2009 Gurman et al.
2009/0043518 A1 2/2009 Roh et al.
2009/0043581 A1 2/2009 Abbott et al.
2009/0150152 A1 6/2009 Wasserblat et al.
2009/0164217 A1 6/2009 Arrowood et al.
2010/0100385 A1 4/2010 Davis et al.
2010/0179811 A1 7/2010 Gupta et al.
2010/0217596 A1 8/2010 Morris et al.
2010/0274667 A1 10/2010 Lanham et al.
2010/0298656 A1 11/2010 McCombie et al.
2010/0324900 A1* 12/2010 Faifkov ................... G10L 15/12 704/E15.005
2011/0295605 A1 12/2011 Lin
2011/0307252 A1 12/2011 Ju et al.
2012/0116766 A1 5/2012 Wasserblat et al.
2012/0310926 A1 12/2012 Gannu et al.
2013/0253919 A1 9/2013 Gutierrez et al.
2014/0012579 A1 1/2014 Ganong, III et al.
2014/0012580 A1 1/2014 Ganong, III et al.
2014/0025379 A1 1/2014 Ganapathiraju et al.
2014/0188475 A1 7/2014 Lev-Tov et al.
2014/0207457 A1 7/2014 Biatov et al.
2014/0222430 A1 8/2014 Rao
2015/0120289 A1 4/2015 Lev-Tov et al.
2015/0161989 A1 6/2015 Hsu et al.
2015/0199961 A1 7/2015 Arkko et al.
2015/0339390 A1 11/2015 Urdiales Delgado et al.
2016/0049144 A1 2/2016 Conkie et al.
2016/0110085 A1 4/2016 Barton et al.
2016/0110994 A1 4/2016 Taylor et al.
2016/0220169 A1 8/2016 Girouard
2016/0269533 A1 9/2016 Taylor et al.
2016/0269841 A1 9/2016 Shinde
2017/0206776 A1 7/2017 Linder et al.
2018/0182378 A1 6/2018 Morris et al.
2020/0111476 A1 4/2020 Kamano et al.

* cited by examiner

SYSTEM AND METHOD FOR COMBINING PHONETIC AND AUTOMATIC SPEECH RECOGNITION SEARCH

PRIOR APPLICATION DATA

This application is a continuation application of prior U.S. patent application Ser. No. 16/550,700, entitled "SYSTEM AND METHOD FOR COMBINING PHONETIC AND AUTOMATIC SPEECH RECOGNITION SEARCH" and filed on Aug. 26, 2019, entitled, and incorporated by reference herein in its entirety.

FIELD OF THE INVENTION

The present invention relates generally to performing text search over audio files using both phonetic and automatic speech recognition search.

BACKGROUND OF THE INVENTION

Searching over audio files is commonly performed using two main categories of methods. Automatic speech recognition (ASR) may decode an audio input to produce a textual index of words with time of occurrence in the audio stream. Text input may be used to search the ASR index. A phonetic search may decode an audio file into a sequence or stream of phonemes which may be searched by converting a text query input into phonemes. Each method has its advantages and disadvantages.

Phonetic search may allow searching for any phrase without requiring an explicit dictionary—e.g. the word need not be defined beforehand in a dictionary, which is typically required for ASR search. ASR may provide high accuracy transcripts, but is typically limited to a pre-determined language model or dictionary. ASR may be "text" search because typically search text is used to search over the ASR index, as opposed to a phonetic search where an input text search is typically converted to phonemes before searching. ASR may be poor at dealing with proper names, acronyms, or words or phrases that are not in the dictionary or lexicon. A phonetic index typically requires storage proportional to the length of the media—e.g. audio file—being indexed. Conversely, an ASR transcript may be compressed, as it may include token sequences including a string, start time, end time, and a score: such a data structure may be very amenable to ZIP-style or other compression. In general, searching using ASR is much faster (e.g. at least 10 times faster) than searching a phonetic index. A typical phonetic search takes time proportional to the duration of the original audio, while a typical ASR search is much quicker, as the text is pre-indexed.

SUMMARY OF THE INVENTION

A text search query including one or more words may be received. An ASR index created for an audio recording may be searched over using the query to produce ASR search results including words, each word associated with a confidence score. For each of the words in the ASR search results associated with a confidence score below a threshold (and in some cases having one or more preceding words in the ASR index and one or more subsequent words in the ASR index), a phonetic representation of the audio recording may be searched for the word having the confidence score below the threshold, where it occurs in the audio recording, possibly after the one or more preceding words and in the audio recording before the one or more subsequent words, to produce phonetic search results. Search results may be returned include ASR and phonetic results.

Embodiments may use a hybrid of ASR transcript and a phonetic index for search, which may improve prior search technology by allowing for more accurate searches (e.g. leveraging the use of ASR for in-vocabulary words), less storage (the more storage-intensive phonetic index may be used for portions of audio that ASR is "unsure" of, e.g. has low confidence scores), and being faster (searching ASR/text transcripts is typically faster than searching a phonetic index). Combining the two techniques into a single searchable index, according to embodiments of the present invention, may provide the benefits of both techniques. A hybrid or unified search index may be created for each audio or media file including ASR for some portions of audio and phonetic for others.

A search request including search term(s) may search an ASR index for occurrences of the term(s) and also search a phonetic index for occurrences of the term(s), and aggregate all results into a single unified result list. Other embodiments may search an ASR index, and only search a phonetic index or lattice where ASR confidence is low.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
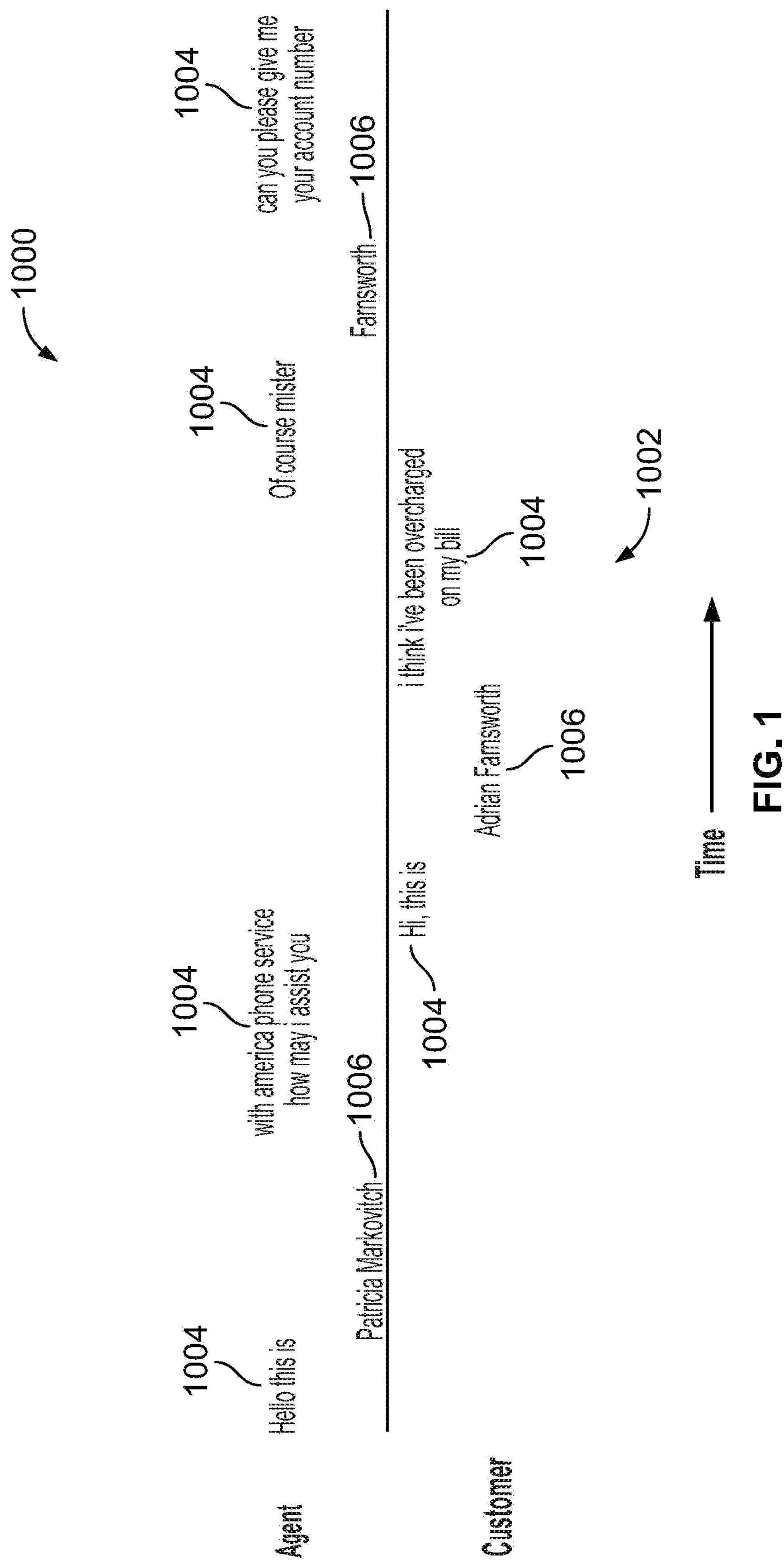
FIG. 1 is a diagram of a conversation between an agent and a customer, with the text of the conversation divided between speakers and between its representation in an ASR transcript and a phonetic index, according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may search for words in audio recordings such as interactions, or other audio recordings. An interaction as referred to herein may be, for example, a conversational exchange between one or more people, e.g. a verbal conversation. An interaction may be for example a recorded conversation. Audio recordings such as recorded interactions may be converted to data that can be searched over, such as an ASR transcript (providing a textual transcript of the audio which may be searched) and a phonetic index (providing a phonetic representation of the audio which may be searched). For example, an ASR transcription of a recording of a conversation between an agent and a customer may enable searching for words or phrases mentioned in the conversation, and a phonetic index can also be used to search for words or phrases. For the sake of simplicity, "recorded interactions" and the various representations of interactions such as an ASR transcript, a phonetic index, or a hybrid index or transcript, may be referred to herein as recordings or interactions, e.g., searching for a phrase in transcriptions of recorded interactions may be simply described (or referred to) herein as searching for a phrase in interactions.

Embodiments may include searching an audio recording such as an interaction, using a text search query. The text search query may be accepted and received, and for example may be a word, e.g., "thank" or it may be a phrase, e.g., "thank you for calling wagglephone electric". In some embodiments, one form of search may be used if the query includes one word only, and a different form or method may be used if the query includes more than one word. However, in some embodiments the same method may be used for single and multiple-word queries. A composite index including a phonetic (e.g. phoneme) representation or index, an ASR transcript or index, a phoneme sequence lookup table, and possibly additional metadata information, or information regarding a correspondence between ASR and phonetic data, may be searched over.

Embodiments may allow for searching within an audio file using an ASR method where appropriate, e.g. where the confidence that the ASR results are accurate is over a threshold, and searching using the same audio file using a phonetic index or lattice method where the confidence is not over a threshold (e.g. less than or equal to a threshold). In some embodiments, it may be considered that a phonetic index is used if (or in locations in a media file where) a confidence score is below a threshold, and is not used if (or where) the confidence score is greater than or equal to a threshold. Such a search may be seamless or unified to a user or application conducting the query: the same text query, single or multiple word, may be searched over a combined ASR-phonetic index to produce appropriate results. In some embodiments this may be achieved by, for each audio file or transcript, creating a unified search index or transcript (ASR and phonetic). In some embodiments a library interface or other interface may be, from the perspective of a user or application conducting a search, identical to the prior phonetic search interfaces. This may allow embodiments to be simpler to integrate into existing applications that already use the existing search interfaces. Creating a unified index may not be a simple matter, and embodiments of the invention solve problems that may arise from a simple combination of ASR and phonetic techniques and indices.

ASR can generally be described as a technique for producing readable text from spoken language—e.g. audio recordings or live speech. For example, ASR may enable a computer to identify words spoken by a human into a microphone. ASR search results may be any data produced by an ASR system or method as known in the art. For example, ASR search results may include, with respect to a search phrase, a file or object identification if a group of files is searched over (e.g., a name of a file that includes the phrase; in some embodiments a single file may be searched), an offset that indicates where in a file the search phrase is found, and a length of a phrase found in the file. The offset may be in units such as time, e.g., represented by a start time of the phrase in, or relative to the start of the file, but may be other units, e.g., the number of bits or bytes into the file from the start (e.g., offset), etc. Methods of locating a phrase other than using time or offset may be used. A length may be, e.g., represented by a time interval and/or a start and an end time in the file, but other methods may be used. Other specific search results may be returned in different embodiments.

Phonetic search results may be data produced by phonetic search system or method as known in the art. For example, phonetic search results may include a file or object identification if a group of files is searched, an offset and a length of a phrase found in the file using phonetic search. Other specific search results may be returned in different embodiments.

Generally, phonetic search as known in the art and referred to herein may include, prior to search, e.g. at an indexing stage, breaking down an audio signal of captured human speech into phonemes, where the set of phonemes may be used during search to identify words. ASR as known in the art and referred to herein may include, prior to search, e.g. at an indexing stage, encoding recorded speech (e.g., into a waveform or set of vectors) and using encoded speech to decode the speech into words or sentences, for example in text or computer readable form. While readable text may, if interpreted properly, allow phonemes to be extracted, phonetic search focusses on the phonemes and identifies phonemes as phonemes, as opposed to readable text, which requires interpretation (e.g., by a reader) to extract phonemes, as a typical language does not always have a simple correspondence between its written form and the phonemes in its spoken form.

In some embodiments, phonetic search results may include, for each phrase found using phonetic search, a score or a confidence level. Any system or method for assigning a confidence level or score to phonetic search results may be used. For example, a confidence level or score may be calculated as the likelihood ratio that a phoneme sequence determined from a phrase occurred compared to a predefined phonetic grammar.

The production of an ASR index and a phoneme index, representation or lattice for a file may each start with a similar process, e.g. decoding, but the two processes differ, at least in that the phonemes used in each process are different. The creation of a phoneme lattice may consider the probability for monophones at each point in time. ASR processing may look for larger combinations of phonemes, e.g. triphones or other compound phonemes, and make definite decisions as to which triphone or other compound phoneme exists; the ASR process may then match the phonemes to an existing lexicon or dictionary to determine a confidence rating or score. In contrast a phonetic or phoneme decoding makes no assumptions about an underlying language or dictionary.

Embodiments of the invention may normalize an input text search query, which may be in various formats (e.g. various capitalizations or spellings; in some languages different character sets or orthography). This normalization may enable a search query typically text typed by a user, or created by an application or program—to be used with a combined search index including phonetic and ASR information. In one embodiment, a text query may be converted or pronounced to phoneme form, and used as discussed herein, which may help solve such a normalization problem.

The text search query may be converted to a phoneme representation of the text search query: for example "modem" may be converted to mo-dumb. An ASR transcript or index created for an audio file may be searched over using any well-known method for searching a text document to produce ASR search results. The ASR transcript or index may include textual representations of words, where each textual representation is associated with a confidence score. The confidence score may indicate, for example, the confidence that the word in the index including the score is actually the corresponding word in the audio recording from which the index is created, or the confidence that the word accurately represents the corresponding word in the audio recording. A phoneme representation or index of the audio file may be searched over using the phoneme representation of the text search query to produce phoneme search results. The phoneme representation may also have confidence scores. The phoneme representation or index may represent or correspond to portions of the audio file corresponding to low confidence scores in the ASR transcript: for example, the phonetic index or representation may represent only portions of the audio file comprising words associated with an ASR confidence score below the threshold. In other embodiments an "overlap" may be considered, and the phonetic index or representation may represent portions of the file including words with an ASR confidence score equal to or above the threshold, possibly with some limit, e.g. X seconds or X words prior to and after the portion with a low ASR confidence. Search results may be returned which may be for example ASR search results and phoneme search results; the ASR and phoneme results may be combined, or portions of one and portions of another may be combined to return combined or compound search results.

A search result may indicate, for example, where in the audio recording or file the word or words in the query is found, typically by time stamp (e.g. the time elapsed in the audio at which the word(s) are found). A search result may include multiple "hits" per file if the query occurs multiple times. Unlike some text-search applications which return a result only if the exact query occurs in the searched-over text, embodiments searching audio may return a result if a certain portion of the query is found, possibly with some confidence, in the audio. A search result may also include the transcript data (e.g. ASR index or transcript data, possibly combined with phoneme transcript data) reflecting the text understood by the search system to be at the location in the audio where the query is found, or deemed to be found; thus the query and the transcript data returned may not match exactly.

An embodiment may search an audio recording or file such as an interaction using text input, such as a text search query including multiple words having an order. The text search query may be used to search over an ASR index created for the audio file to produce ASR search results which include words, each associated with or having a confidence score (e.g. a number indicating the confidence that the word accurately represents the corresponding word in the media or audio recording). For each of the words in the ASR search results having a confidence score below a threshold, e.g. indicating that there is less confidence than other words that the word in the ASR index accurately reflects the audio file, a phoneme search may be performed, and the phoneme results used instead of the ASR results. In one embodiment, a confidence threshold of 0.7 on a scale of 0-1 may be used, but other thresholds and scales may be used. Typically, the more ASR results that are above the threshold, the greater the ASR usage, resulting in lower storage requirements.

Each of the ASR result words typically have one or more preceding words and one or more subsequent words in the ASR index or transcript (except for the rare case of a word at the beginning or end of the transcript). For the low-confidence ASR search words, a phoneme representation of the audio file may be searched over. Such a phoneme search may occur only where the target word occurs in the audio recording after the one or more preceding words and in the audio recording before the one or more subsequent words: this may produce phoneme search results. Different embodiments may use different "windows" such that the phoneme search may occur over a certain portion of preceding and subsequent words as well, producing a window or an overlap with the ASR search. This overlap may be measured in words (e.g. X words before and/or after overlap) or time (e.g. search X seconds before and/or after the beginning and/or end of the time of occurrence of the low confidence word in the audio) or another measure. For example, an overlap search may include searching over a phoneme representation of the audio file before the end of a preceding word and after the beginning of a subsequent word. Search results may be returned which include or which are a combination of ASR search results and phoneme search results.

Embodiments may provide improvements to prior art search technologies in that may increase search accuracy. Each word generated in an ASR transcript has a score or rating indicating the likelihood the word is a match, or the confidence the text word in the ASR transcript represents the corresponding portion of the original audio file. Where the ASR transcript is deemed to be accurate (a high score, or score over a threshold), an embodiment uses the ASR transcript to search instead of the phonetic (e.g. phoneme) representation, index or lattice. For words with a low confidence or score, such as out-of-vocabulary (OOV) words (typically words not in the lexicon of the process creating the ASR transcript for the audio), an embodiment may only search the phonetic index. The phonetic index may thus be searched where ASR index is not accurate. A search of the hybrid index may use the ASR index where confidence is high, and the phonetic index for portions of the audio where ASR index is less confident. Embodiments may allow "stereo" audio—e.g. audio recording a conversation involving two different people—to be indexed with smaller storage than prior art mono indexing methods.

Embodiments may provide improvements to prior art search technologies in that they may be much more time and storage efficient. In general, searching ASR transcripts, which is typically a text search, is much faster (e.g. at least 10 times) than is searching a phonetic index. Since some embodiments only need to create or store, and to search, a phonetic index where an ASR search is not confident, overall search speed may be significantly faster than searching a full phonetic index only, and storage needs may be reduced. In a typical embodiment, since a majority of the words are not OOV, the majority of the combined index or transcript will be ASR-format, which is more storage-efficient than phonetic format. In some embodiments, on average, less than 20% of the original media file requires that a phonetic index be created in stored, resulting in a compression of 5$x$ over a prior process using a phonetic (e.g. phoneme) representation or index. Typically, a search index is created beforehand for each audio or media file to be searched. In some embodiments, an ASR index is created for the entirety of each file, but a phonetic (phoneme) index or lattice is only created for portions of the file where the ASR index shows low confidence (allowing for a window or overlap as discussed herein). Thus for large portions of the audio file, no phonetic index or lattice is created and stored. The unified or hybrid index may in some embodiments be two different indices—ASR and phonetic—linked by timestamp of the original audio file.

A phonetic search may allow searching for any phrase, including OOV phrases, but requires storage proportional to the length of the audio file, and may not work well for short phrases. An ASR search may not handle words not in a lexicon (OOV words) well, and may not be as robust due to environmental effects. A unified index may provide an improvement by a decrease storage requirements and hardware costs (since search may be faster, less processing may be needed), and may allow for short phrase searches. Some prior art systems may generate and store a complete phoneme index and ASR transcript for every audio or media file.

Embodiments may create a hybrid index for each audio or other file to be searched. An ASR index may be generated for a media file, using known methods, typically prior to the generation of any phonetic representation or index. However, in some embodiments, since the computational costs of creating a phoneme index is low compared to that of creating the ASR index, the phoneme index may be created without regard to the existence of the ASR index, and either both may be saved, or the ASR index may be used to determine which portions of the phonetic index to save and which to discard.

The ASR index may be a time-ordered sequence of words (e.g. a transcript), represented as, for example:

String—the putative word;

StartTime— the time the utterance starts typically relative to the start of the media (e.g. in milliseconds);

EndTime— the time the utterance ends typically relative to the start of the media; and Score—a confidence score, for example ranging from 0.0->1.0, indicating relative confidence in the result for the specific string.

Other data may be stored in an ASR index, and other formats may be used. Typically the entire audio file has an ASR index created, while only a portion of the audio file has a corresponding phonetic representation or index created.

Word strings created for an ASR index or transcript are typically in a normalized form (e.g., capitalized with a single unique spelling).

When searching, in order for a text search input to be consistent between the ASR and phonetic searching, some embodiments do not search for the string presented as a search term directly, as the input string may be in any of several forms (e.g. with varying capitalization, phonetically spelled, misspelled, etc.). To accommodate this variation, embodiments may take each word string in a query, and convert it into a sequence of phonemes, using the same pronunciation engine as used for phonetic search. In some embodiments, a phoneme is represented as a single integer value. The phoneme sequence represents the phonetic pronunciation of the utterance.

A search over a phonetic index is performed over and using phoneme sequences, rather than text strings as used in an ASR search. Embodiments may convert portions or all of the ASR index or transcript to phonetic representation at indexing time, prior to searching, and prior to receiving a search. An embodiment may "pronounce" (e.g. convert from text to phoneme) each word in the ASR transcript to build a master lookup table providing a correspondence between pronounced words and their appearance in the ASR index. For example, for each word in the ASR transcript, the phoneme sequence corresponding to the word may be generated. A master lookup table may be created, where each unique phoneme sequence in the ASR transcript (e.g. each word in the ASR transcript) acts as a key. For each key a link to the corresponding ASR index entry may be stored. In other embodiments, for each key, some or all of the corresponding ASR transcript results (e.g. StartTime, EndTime, Score) may be stored in the lookup table.

A sample phonetic master phoneme sequence lookup table (e.g. a pronounced ASR table, or pronunciation index), which may be used or stored in conjunction with an ASR index is shown in Table 1:

TABLE 1

| Phoneme Sequence (with corresponding text for illustration) | Transcript Index (pointer or link to location in ASR index) |
|---|---|
| UH-MARE-IH-CUH ("America") | 5 |
| MO-DUMB ("modem") | 15, 27, 65 |
| IN-TER-NET ("Internet") | 24, 104, 163 |

The transcript index entries may be links or pointers to an ASR index associated with the same media file as is the lookup table, e.g. to a row, or ordered entry or index in an ASR index, in any appropriate form. For example, each entry in an ASR index may have an integer numbering, but other forms may be used. The phoneme sequence lookup table may be included in a combined or composite index and may be used during a combined search.

For example, during a search, searching over the ASR index may include converting the text search query to a phoneme representation and using the phoneme representation to access the phoneme sequence lookup table, to return an index to the ASR index. During a search, the search word(s) may each be pronounced or converted to phoneme form, and this phoneme form may be searched in the phonetic sequence lookup table to find the transcript index or mapping to occurrences in the ASR index. A single entry in a phoneme sequence lookup table may map to multiple ASR index entries if the word occurs in multiple places in the original media file. In some embodiments, words with ASR confidence scores below a threshold will not appear in the phoneme sequence lookup table, and thus the decision at search time as to whether a word is low confidence can be made by determining that the pronounced word does not appear in the phoneme sequence lookup table.

Since some words have multiple possible pronunciations (e.g., "read" may be "reed" or "red"), a phoneme sequence lookup table may include multiple entries corresponding to the same word in the original media file and to the same entry in the ASR index.

An embodiment using such a lookup table may accommodate multiple possible pronunciations by storing copies of transcript results in the table for each possible pronunciation of each transcript word. When a search is executed, the pronunciation of the term may be explicitly set by the user or process (e.g. a specific phonetic spelling) or a process may use the pronunciation engine to find the most likely pronunciation (which may be default behavior). The lookup table may thus provide a way to find results for any pronunciation.

Table 2 below depicts an ASR transcript or index for an audio or other file which may be used in conjunction a master lookup table such as the example table shown in Table 1. Table 2 shows an ASR index created for an audio file including only "Hi, my name is Patricia Atwater. How can I help you?" (typically the audio files analyzed and searched over are longer than two sentences). In this sample audio file, "Patricia" and "Atwater" are OOV, not being in a typical lexicon or dictionary, and thus index entries corresponding to these words have low confidence scores.

TABLE 2

| Word | Conf. Score | Start Time | End Time | ASR Pronunciation table index |
|---|---|---|---|---|
| HI | .9 | 10 | 50 | 15 |
| MY | .95 | 55 | 70 | 8 |
| NAME | .96 | 75 | 85 | 22 |
| IS | .85 | 87 | 92 | 4 |
| PATRICK | .5 | 95 | 105 | <no pronunciation entry> |
| AT | .6 | 108 | 124 | <no pronunciation entry> |
| HOW | .9 | 131 | 135 | 10 |
| CAN | .98 | 137 | 143 | 31 |
| I | .94 | 151 | 155 | 18 |
| HELP | .9 | 158 | 164 | 54 |
| YOU | .88 | 165 | 169 | 205 |

As can be seen in the table above, the OOV words Patricia and Atwater are recognized by an ASR processor incorrectly (Patrick and at), and with low confidence. The confidence score may be in other units, e.g. a percentage. Start time and end time may be for example in milliseconds from the start of the audio, but may be in other units or formats. An optional ASR pronunciation table index may point, e.g. using a pointer or index number, to an entry in phoneme sequence lookup table. The ASR index may have a sequence or ordering that matches the sequence of words as they appear in the original media file, e.g. by ordering of entries, or rows.

Determining the threshold for a "high" confidence score (where a process may rely on ASR instead of turning to a phonetic process) may depend on different factors. A threshold may be found by optimizing overall search accuracy of a suitably sized test set. The threshold value may be incrementally swept to determine an optimal tradeoff between using ASR transcript words and a phonetic search. The appropriate threshold may vary depending on the audio quality, language being examined, or other environmental factors specific to a given media set (e.g. context, or collection of audio files). Embodiments may allow this threshold to be set on a file-by-file (e.g. audio recording by recording) basis if desired. In practice, an optimal threshold may be determined based on test media sets for a given source or context, and then applied uniformly for media from that source or context.

In one embodiment, an ASR index or transcript is created first, for the entirety of the target audio file, and based on the ASR index or transcript, a phonetic transcript or lattice is created for portions of the audio file. In one embodiment, the phonetic master phoneme sequence lookup table, and/or the ASR transcript or index, are processed to identify portions or media time segments (e.g. defined by StartTime/EndTime pairs) where ASR confidence is low (e.g. a confidence score is below a given threshold). These segments may be gathered into a time-ordered list of time intervals each of which are to be used with a phonetic index, using the standard phonetic indexing method. Various methods may be used to determine or derive a segment of an audio file requiring a phonetic index, for example, a process may:

Start by processing each word in the ASR transcript in sequence.

When an ASR word is encountered with confidence below a threshold, start a new time segment to be used with phonetic processing, where the start of the new time segment may be based on several criteria, for example:

a. Start time of the current (low confidence) ASR word;

b. Start or end time of the previous (high confidence) ASR word;

c. Start or end time for the N previous high confidence words, where N may be 1, 2, etc.;

d. Add/subtract a fixed time window to any of the values above.

Continue examining words in the ASR transcript, incrementing the phonetic portion accordingly, until an ASR transcript word is found with a confidence score equal to or above the threshold (or the end of the transcript is reached). Once such a high confidence ASR word is found, set the end of the time segment, and add to a master list of media segments requiring a phonetic index. The end time for the segment may be computed based on similar criteria to the start time.

This process may be continued until the entire ASR transcript has been processed. FIG. 1 is a diagram of a conversation between an agent and a customer, with the text of the conversation divided between speakers and between its representation in an ASR transcript and a phonetic index, according to illustrative embodiments of the present invention. Referring to FIG. 1, the text in area 1000 is spoken by an agent and the text in area 1002 is spoken by a customer. Text blocks 1004 are indexed above some threshold of confidence in an ASR transcript, and text blocks 1006 are indexed by a phonetic index because the corresponding ASR confidence does not meet a threshold.

After a list of low confidence media segments, e.g. list of media segments requiring a phonetic index, is generated, the phonetic index corresponding to these segments may be created. In some embodiments, a separate phonetic index may be created for each identified media segment. Alternately a composite phonetic index may be created by indexing all of the identified media segments at one time: the segments may be if effect stitched together and indexed as if it were a single recording.

Figure 2A:
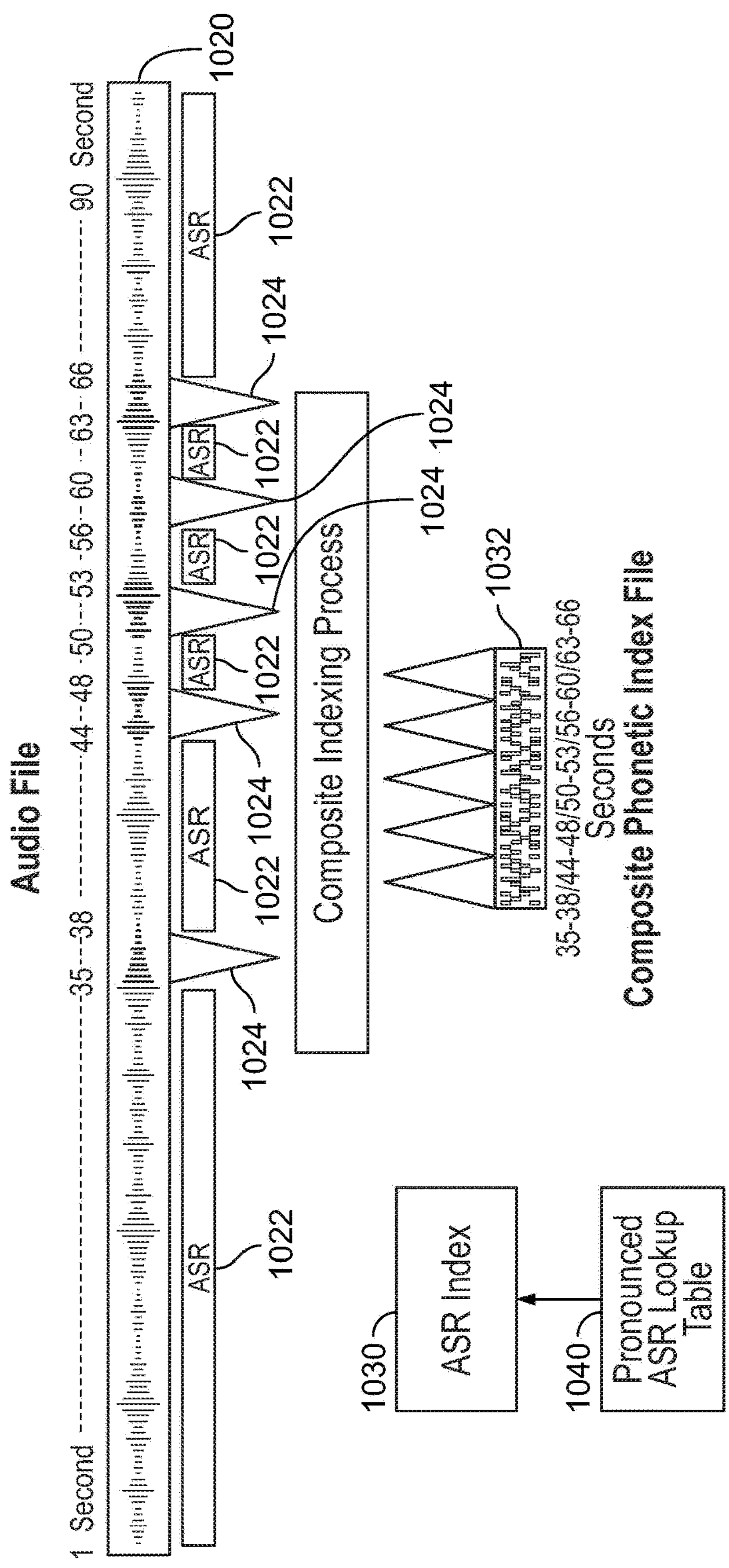
FIG. 2A is a diagram of the correspondence between a media or audio file, an ASR index, and a phonetic index, according to illustrative embodiments of the present invention.

FIG. 2A is a diagram of the correspondence between an audio file, an ASR index, and a phonetic or phoneme representation or index, according to illustrative embodiments of the present invention. An audio file 1020 may include segments 1022 which have a confidence score equal to or above a threshold and segments 1024 which have a confidence score below the threshold. Segments 1022 may be successfully indexed by ASR index 1030 (segments 1024 may be indexed by ASR index 1030, but with low confidence). Segments 1024 may be indexed by phonetic (e.g. phoneme) representation or index 1032, which may be a composite phonetic index produced by a composite index creation process as described. Phonetic representation or index 1032 in one embodiment covers only segments 1024, and not segments 1022 (except for possible extension windows or overlaps). In some embodiments the phonetic representation or index represents, e.g. contains phonetic information describing, only portions of the media or audio file comprising words associated with a confidence score below the threshold and not portions with a score greater than or equal to the threshold (in other embodiments the use of the threshold can be such that the phonetic representation is turned to when the score is less than or equal to the threshold, and not when the score is greater than the threshold).

Phonetic representation or index 1032 may include buffers, windows or overlap, e.g. windows allowing the phonetic search to be extended before and after the portions with a low confidence score. In some cases, the phonetic representation or index represents portions of the audio file with words having a confidence score below the threshold, and also a window or an overlap portion including words or portions of words with a confidence score not below the threshold. The overlap may allow phonetic search to extend a certain number of milliseconds, seconds or words before or after the portion of low ASR confidence.

In some embodiments, the phonetic index may represent the same portion as the ASR index, and a searching operation may decide which between the ASR and phonetic indexes to search, or to search both.

Pronounced ASR lookup table, or sample phonetic master phoneme sequence lookup table 1040 may include, for each word in the ASR index, a phoneme representation and a corresponding mapping, link or links to the location (e.g. row or ordered entry) in the ASR index. A composite search index may include ASR index 1030, phonetic index 1032, and pronounced ASR lookup table 1040. In some embodiments the phonetic index need not be a composite phonetic index; for example separate phonetic indices for each time segment may be used.

Figure 2B:
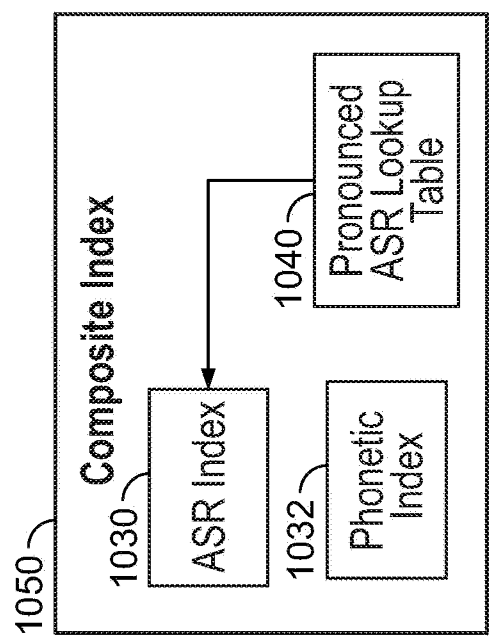
FIG. 2B is a diagram of a composite index for a media or audio file, according to illustrative embodiments of the present invention.

FIG. 2B is a diagram of a composite index for a media or audio file, according to illustrative embodiments of the present invention. A composite index 1050 may include ASR index 1030, phonetic index 1032, pronounced ASR lookup table 1040, and possibly other tables or databases such as a table indexing entries in a stitched-together phoneme index to time points in a media file.

An ASR transcript (e.g. ASR index 1030) may be compressed by any number of methods, including ZIP compression. Similarly, the phonetic representation or index may be compressed as well, although it may already have a fairly optimal compression format. A combined index may have significantly reduced storage space, when compared to a phonetic or phoneme representation or index.

In some embodiments, a different process may be used to search using a single word query as opposed to a multiple word query. A query including only one word may first be processed by pronouncing the word (e.g. converting the word to a phoneme sequence). The resulting phoneme sequence may then be used to search over the master pronounced ASR lookup table. The entries in the ASR lookup table corresponding to the pronounced phoneme sequence may be referenced to find their associated references or links to the ASR index, and these associated links may be applied to the ASR index to return search results, typically only for portions of the ASR index with confidence over a threshold (e.g. segments 1022 of FIG. 2A). In some embodiments all ASR index results are used or returned, regardless of the confidence score. The determination as to whether a search query word has an ASR confidence score above or below a threshold may be by determining the word when pronounced does or does not appear in the phoneme sequence lookup table.

A search using the query may also be performed on the composite phonetic or other phonetic index (e.g. an index such as phonetic index 1032 of FIGS. 2A and 2B, of media time segments not represented, or represented with low confidence, by the ASR transcript, such as segments 1024 of FIG. 2A). In the case there are separate phonetic indices for each time segment, each segment may be searched using the word; in the case that a single (e.g. composite) phonetic index exists, this single phonetic index may be searched. Phonetic search results may be returned, which may include time offsets, and may be combined with the ASR search results.

In the case that one phonetic index is "stitched" together from multiple phonetic indexes, it may be that the time references in the file are relative to the beginning of the file, in which case a phonetic time segment table may be created and used to map or convert time offsets in the file to the original media file time offsets, or time offsets in the ASR index. Phonetic returned matching results may have their time offsets (which are relative to the phonetic index) converted to media time offsets, based on the phonetic time segment table (which may map media times to phonetic index times).

A "stitched together" index (phonetic and ASR) may be based on an overlap window used around or extending the portions where an ASR index has low confidence; there may be some overlap in the original source audio used for each type of results. If redundant results are returned, this may be indicated by a similar time stamp, within some tolerance.

As with the use of a phonetic search alone, the aggregate of the ASR results and phonetic results may be returned as the results of the search. The combined or aggregate search results may include, for example, one or more of an identifier or name of the media file in which the search query is found or matched (if more than one file is searched over); a location corresponding to the text search query, e.g. a time offset in a media or audio recording typically measured from the start of the media or audio file; and the text represented by the ASR and/or phoneme index as corresponding to the location (since in some embodiments the search query need not return an exact match).

In the case of a single word search, instead of always searching both an ASR index and phonetic index a search of the phonetic index may be performed only in the case there are no ASR index matches for a word, on the assumption the ASR index search would have found the word if present in the audio.

A multiple-word query or search (e.g. "how may I help you") may use a process different from that of a single word search. However, in some embodiments, a multiple-word search may use features of an embodiment associated herein with single word search, and a single word search may use features of an embodiment associated herein with multiple word search. In one embodiment, for a multiple-word query or search, if all search words find a match in the proper sequence of an ASR index, or if a certain percentage of search words match in the proper sequence of an ASR index, no phonetic search is performed. In other embodiments, any non-match from the ASR index results in a phonetic search for at least the non-matching search words. "Non-match" may mean that a search word is not in the ASR index, or is in the ASR index with less than a certain confidence score.

Typically, a match to a query for a multiple-word search requires that the sequence of the words in the query matches the sequence of the words in the ASR and/or phonetic indices, possibly within a time threshold. For example, for the search query "how may I help you", "how" would have to be found in an index before "may", and possibly also within a maximum time window, e.g. not separated by "may" by more than a certain period of time. In one embodiment, matching the sequence of words in the query to the sequence in the media recording may be performed using the sequence of words as they appear in the ASR transcript or index. For example, the ASR index typically has entries ordered in the same order as the words corresponding to each entry appear in the original media file. Words in the search query that are sequential (e.g. one appearing immediately after the other in order) should also be sequential in the ASR index in order to be deemed as having the same sequence in both the search and ASR transcript. If a gap appears in the ASR sequence due to one or more search words having low confidence, the phoneme index may be consulted, and determining correct order may be done by determining whether or not the timing information (e.g. for the beginning and/or end of the word in the phoneme index) corresponds to the period marked by the end of the last word before the gap in the ASR index and the beginning of the first word after the gap in the ASR index, using the timing information for each word in the ASR index.

In some embodiments, a search query need not match every word to produce a "hit" or search return. For example, the search query "how may I help you" may return:

a. "how may we help you" occurs at 2 minutes 20 seconds in the audio file; and
b. "how can I help you" occurs at 5 minutes 4 seconds in the audio file.

A multi-word search embodiment may first search an ASR index for an exact matching sequence, with constraints on how much time the phrase may take (e.g., the phrase must be spoken in less than 5 seconds, or some suitable time limit) Matching words may be weighted based on their corresponding ASR score, to provide an overall confidence of a match for each individual word. A match score for the entire multi-word search query may be calculated based on data for each individual word, e.g. averaging the confidence scores (ASR and/or phoneme), or taking the minimum for all or certain of the words' scores. The match score may be weighted or altered based on how many words in the query match the ASR index with a corresponding confidence score of above a threshold, or how many words in the search appear in the query return (a query return need not include all words in the search query). For example, in the case of a query search for "the cat in the hat", a phrase in the ASR transcript of "cat in the hat" would be considered an 80% match. In particular, connecting words or stop words such as "a", "the", "in", "and" etc. may be ignored, but other words may be ignored as well. The confidence score may be further weighted for example by associating a weight with each word based on whether it is a noun, verb, or some other criteria for weighting the significance of certain words in a search phrase. Thus in one embodiment a search for "the cat in the hat" may effectively look for "cat" followed by "hat" with an additional constraint such as a maximum time and/or maximum word count.

In one example embodiment, an example search query of "Thank you for calling Wagglephone electric" may perform a single-word search over an ASR index for each of the words within the query and check the return locations (e.g. timestamps, or the row or index for the word in the ASR index, indicating an ordering of the word in the media file) to ensure the consecutive sequence of words in the query has the same consecutive sequence in the ASR index. An additional check may be performed that the end and start times of sequential words are within a certain timestamp (e.g. ensuring "you" does not occur more than a certain time after "thank"); in other embodiments such "gaps" may be ignored. "Stitching", e.g. ensuring the returned words or "hits", are in sequence may be performed as known in the art. For example, numerous returns for "you" and "thank" may be performed (as these words may appear multiple times in a media file), but only those that match the time sequence and/or the ordering/index sequence as in the query will be used for returns or results for this particular sample query. A search result for each individual word may be the time it occurs (e.g. start time, or start and end time) along with a confidence score for that word.

For words that do not match the ASR index with at least a threshold confidence score (which may be performed by determining that the word does not appear in a phoneme sequence lookup table), the word may be searched for in a phonetic index, based on time or timestamp (in some embodiments, if there is a match for every query word, possibly ignoring stop words, no phonetic search is performed). The determination as to whether a search query word has an ASR confidence score below a threshold may be by determining the word when pronounced does not appear in the phoneme sequence lookup table. For example, a search may be performed for the word (e.g. Wagglephone may be OOV and if so corresponds to a confidence score lower than the set threshold). Depending on the type of search performed, the return from the phonetic index may include sequence and/or time information. For example if the phonetic search is performed with no "window" extending the search, only time stamps may be returned, and if a window is used, the search may extend a certain time before and/or after the "hit" or return, which may find words before and after the target word or words. In one example, Wagglephone may occur in the phonetic index starting at 3.2 seconds, "thank you for calling" may end in the ASR index at 3.0 seconds, and electric may occur in the ASR index at 3.3 seconds. Thus it may be determined that Wagglephone occurs in a proper sequence with "thank you for calling" and "electric", and it may be deemed that a match has occurred based on the combined ASR and phonetic search. If a broader window is used, it also may be determined whether or not the phonetic index includes "calling" before Wagglephone and "electric" after Wagglephone, and these occurrences may be required to determine that a match occurs. A score may be calculated for a match, which may be for example a weighted combination of individual word scores, and in some embodiments stop or other common words may be ignored.

In some embodiments, for a multi-word search, both an ASR search and a phonetic search may be performed, for example by stitching together the results taking into account ordering (e.g. fitting the phoneme results within the proper order in the ASR results).

A broader window may be used around phonetic searches within a multi-word search. A time window, for example of a pre-set duration, may follow and precede the returned time of occurrence of a phonetic "hit" to obtain a number of successive and preceding words around a low confidence ASR word or words searched for in a phonetic index. Thus the phonetic word sequence may be expanded to allow for a maximum length phrase (e.g., a four-word sequence within the phonetic or ASR search may be used to determine a time window). A phonetic search may be more accurate the longer the phrase searched for. Thus in the example above, if "Wagglephone" is low confidence in the ASR results, an embodiment might search using a phonetic index before and after phonetic one or two words for phonetic search. The time window around each low confidence ASR word, to determine what time segment requires a phonetic index, may be expanded to accommodate a multi-word match in the phonetic index. Different embodiments may use different criteria for setting the time window around a low confidence ASR word, for example the following not mutually exclusive methods may be used:

- A variable time based on a time of N words before and end time N words after the low-confidence ASR word.
- An embodiment may pronounce (e.g. convert to phonemes) each ASR word from the result to create this padding and set the window based on a maximum allowed phoneme count in the converted or pronounced result. For example, 25 phonemes before and 25 phonemes after the low-confidence ASR hit may be used as a window.
- A maximum allowed time separation between words may be imposed: e.g. if in a window there is a time gap above a threshold, this gap may be used to be the limit of a time window. A word search is typically not performed across a sentence boundary which may be indicated by a time gap between words.

An example process for using a window extending beyond a phonetic search return includes, for example starting with the low confidence ASR word, and looking backward until one or more of the following criteria are met (other or different criteria may be used):

- Reached the maximum word count;
- Reached the maximum phoneme count; and/or
- A word precedes the current word or last word reviewed by more than the maximum allowed word separation time.

In this manner the start time for a phonetic index window may be created. A similar process may be performed looking forward in time from the low confidence ASR word to create the later bound for the phonetic search window, to provide an end time for the segment. This may provide phonetic indices to accommodate the maximum allowed search phrase around any given low confidence ASR word or words.

Figure 3:
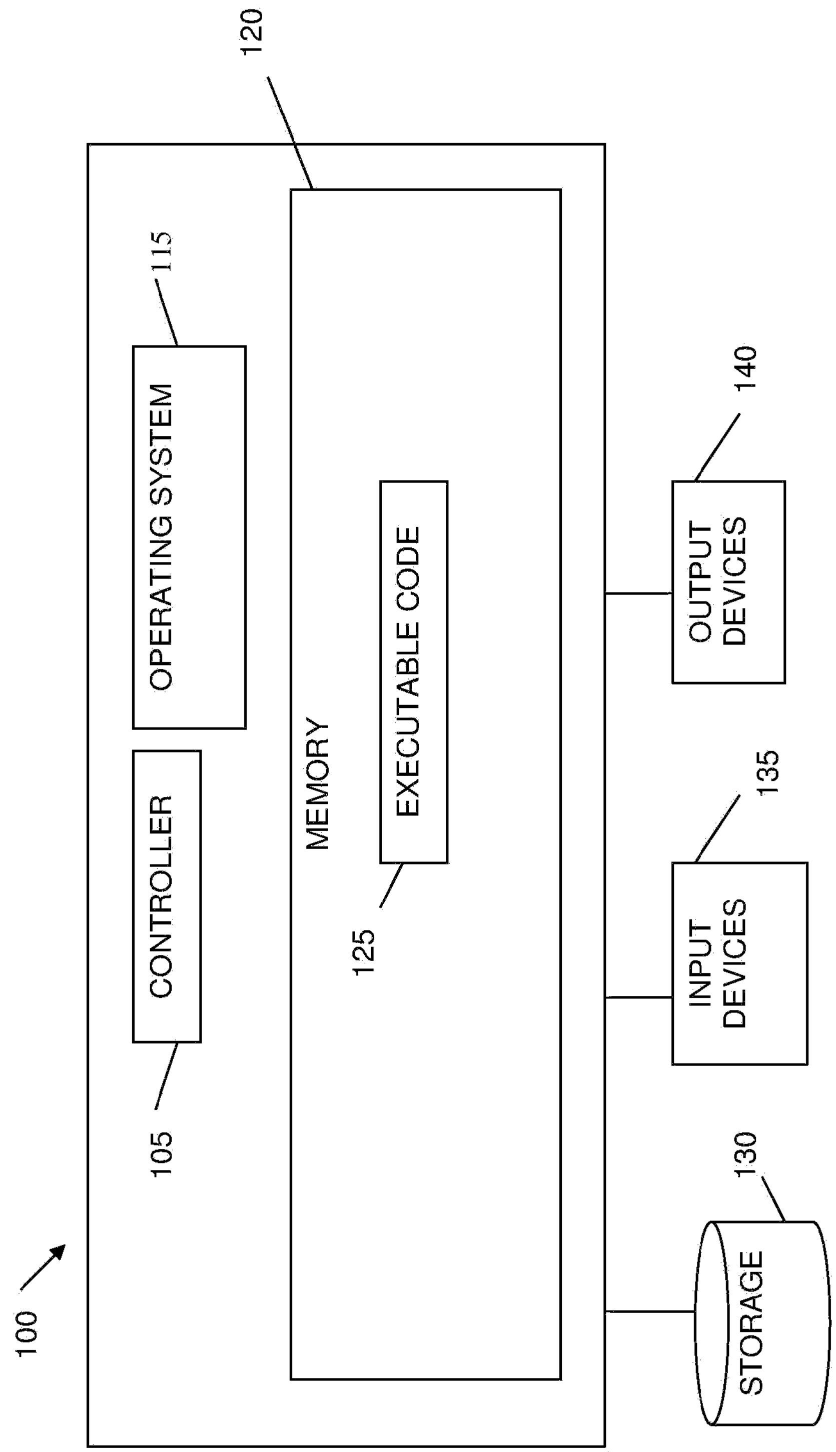
FIG. 3 shows high level block diagram of an exemplary computing device according to illustrative embodiments of the present invention.

Reference is made to FIG. 3, showing a high-level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may be, or act as the components of, a system according to some embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may conduct searches, as discussed herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as audio files, transcripts, phonetic lattices, etc. may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (MC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 4:
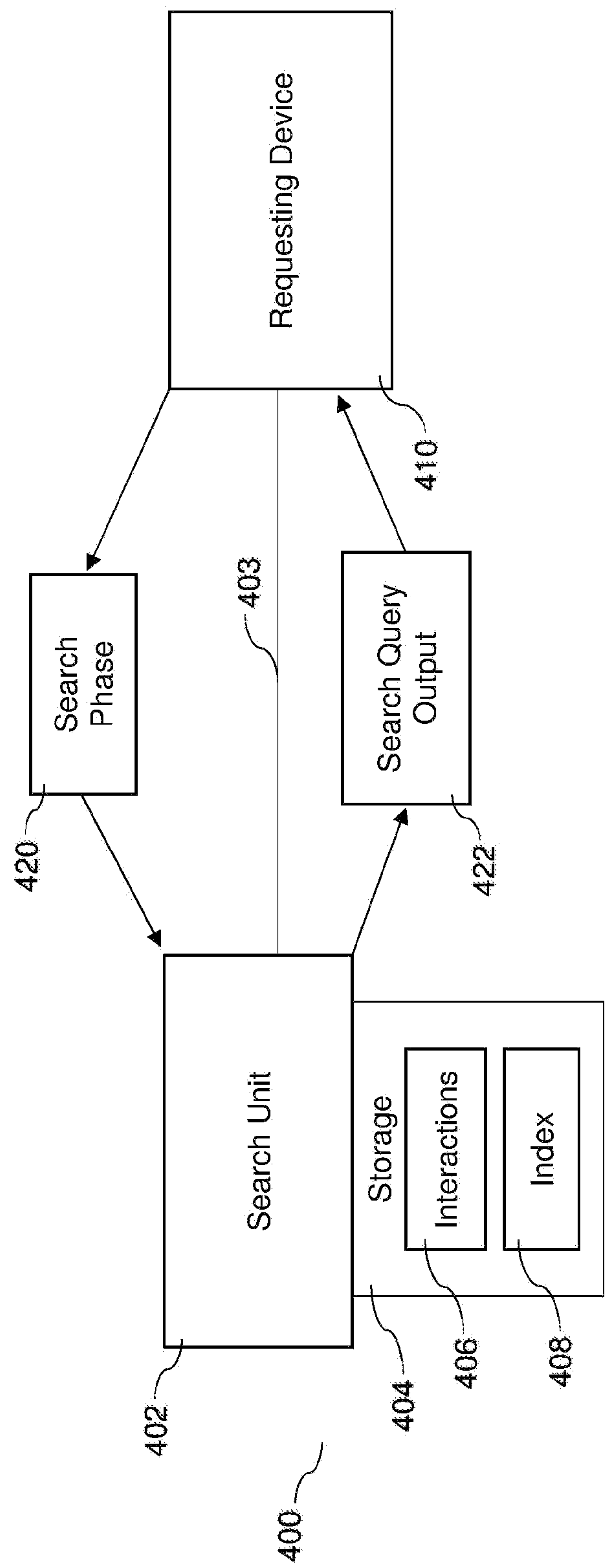
FIG. 4 shows high level block diagram of an exemplary computing system according to illustrative embodiments of the present invention.

Reference is made to FIG. 4, an overview of a system 400 according to some embodiments of the present invention. As shown, a system may include a search unit 402 that may receive as input from a requesting device 410, such as a search phrase 420, and produce a search query output 422. Search unit 402 and requesting device 410 may be connected for example by a network 403, such as the internet or another network.

System 400 or components of system 400 may include components such as those shown in FIG. 3. For example, each of search unit 402 and requesting device 410 may be, or may include components of, computing device 100, e.g., each of search unit 402 and requesting device 410 may include a controller 105, a memory 120 and executable code 125.

As shown, search unit 402 may include, or may be operatively connected to, a storage system 404 (e.g. storage 130 of FIG. 3). For example, interactions or other audio data 406, and a combined or composite index 408 such as shown in FIGS. 2A and 2B, may be stored on storage system 404. Composite index 408 may include (e.g. may have within it) phonetic (e.g. phoneme) representation or index 1032, ASR transcript or index 1030, pronounced ASR lookup table 1040, and possibly other tables or databases such as a table indexing entries in a stitched-together phoneme index to time points in a media file.

A text query or search phrase 420 may be any phrase that a user or application is searching for, and may be entered or sent via requesting device 410, for example executing an application or program producing a search phrase, or by device 410 being operated by a person entering a search phrase. Search phrase 420 may be provided to an embodiment as input, e.g., when a user or application wants to search for a phrase in interactions, media files, audio files or other data in storage system 404, e.g., find all the interactions and locations or times within the interactions that include phrase 420 (or a close approximation), or find phrase 420 within one single interaction or file.

Figure 5:
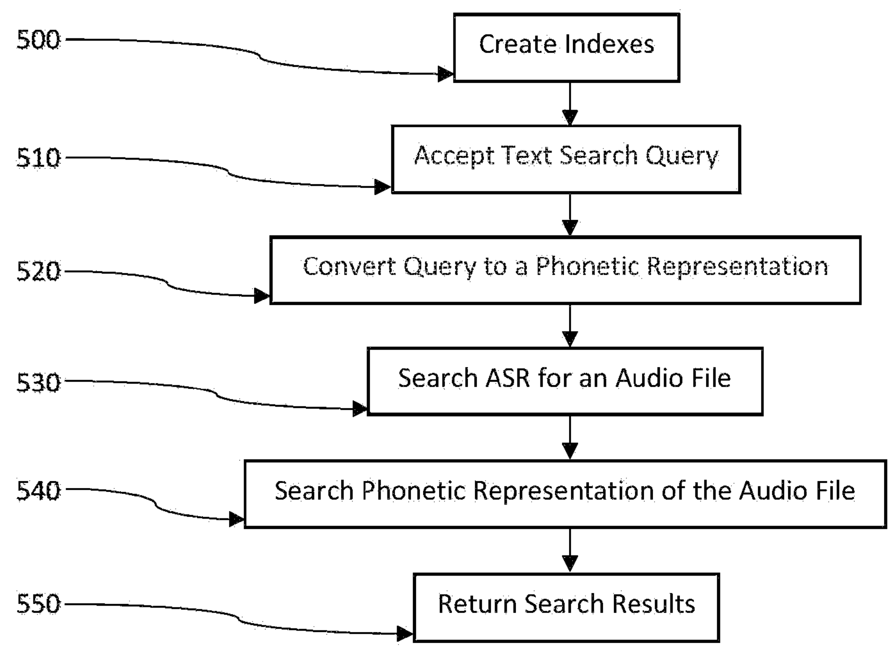
FIG. 5 shows a flowchart of a method according to illustrative embodiments of the present invention.

FIG. 5 shows a flowchart of a method according to illustrative embodiments of the present invention. The operations of FIG. 5 may be used with the data structures and systems as shown in FIGS. 1-4, but other systems and data may be used.

In operation 500, for one or more media files, indexes may be created. For example, an ASR index and a phonetic index may be created along with other tables or indexes (e.g. a phoneme sequence lookup table, and possibly additional metadata information, or information regarding a correspondence between ASR and phonetic data) for one or more media files (typically one combined index per file). Other indexes or tables may be created.

In operation 510, a text search query may be accepted.

In operation 520, the text search query may be converted to a phonetic representation of the text search query, for example by computerized pronunciation of the query.

In operation 530, an ASR index created for an audio file may be searched over using the text search query, which may produce ASR search results. Typically, the ASR index includes textual representations of words, each associated with a confidence score or rating reflecting the confidence that the word in the ASR index represents the source word in the source media file.

In operation 540, a phonetic representation of the audio file may be searched over using the phonetic representation of the text search query. This may produce phonetic search results. In one embodiment, the phonetic representation represents portions of the audio file corresponding to low confidence ratings or scores, possibly with a window or overlap extending the phonetic search into portions of the audio file that are also represented by the text search query.

In operation 550 search results may be returned including the ASR search results and the phonetic search results.

Other or different sequences of operations may be performed.

Figure 6:
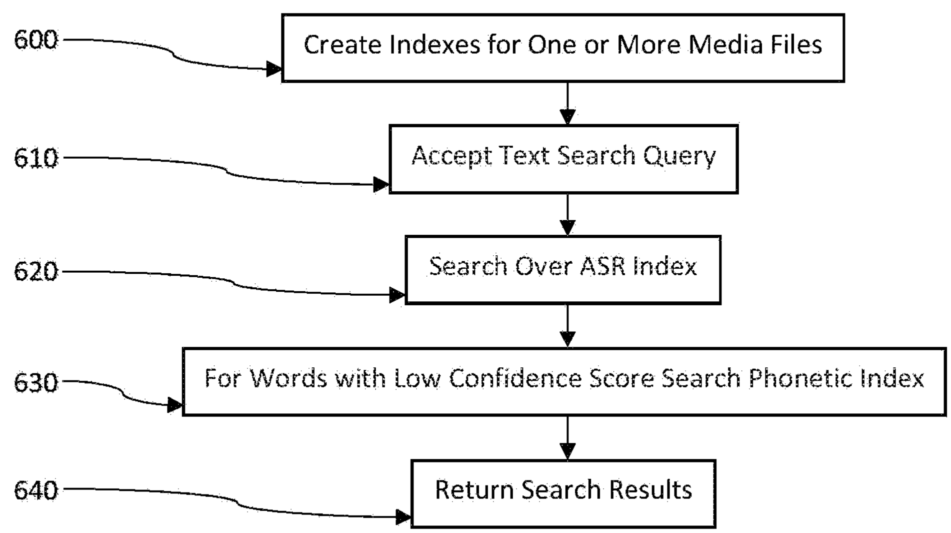
FIG. 6 shows a flowchart of a method according to illustrative embodiments of the present invention.

FIG. 6 shows a flowchart of a method according to illustrative embodiments of the present invention. The operations of FIG. 6 may be used with the data structures and systems as shown in FIGS. 1-4, but other systems and data may be used.

In operation 600, for one or more media files, indexes may be created. For example, an ASR index and a phonetic index may be created for one or more media files (typically one combined index per file). Other indexes or tables may be created, such as a phonetic master phoneme sequence lookup table or a table indicating the timestamp for portions of a phoneme index.

In operation 610, a text search query may be accepted. In one embodiment, the query may include a number of words, and the words may have a sequential order in the query. An ASR index and a phonetic index may have been created for the audio recording; in some embodiments the phonetic index is created only for portions of the media file, e.g. audio recording, where the ASR index indicates that the words have low confidence scores or ratings, but in other embodiments both the ASR and phonetic index may be created for the entire media or audio file. If only a partial phonetic index is created, it may extend to cover overlap or windows of the ASR search.

In operation 620, an ASR index may be searched over. The ASR index may be created for an audio recording using the text search query to produce ASR search results, the ASR search results including words, each word associated with a confidence score.

In operation 630, for each of the words in the ASR search results associated with a confidence score below a threshold a phonetic index or representation of the audio recording may be searched. If the word having a low-confidence score has one or more preceding words in ASR search results and one or more subsequent words in ASR search results, the search may be conducted for the word in a certain portion of the phonetic index: where it occurs in the audio recording after the one or more preceding words and in the audio recording before the one or more subsequent words. E.g. since a word may appear multiple times in a media file, and thus may occur multiple times in an index, the phonetic search may be conducted only in the phonetic index in the portion matching the specific identified low-confidence gap, possibly extended by a window or overlap portion. This may output or produce phonetic search results. A "window" extending the search such that it overlaps with ASR index words not having a confidence score below the threshold may be used.

In operation 640 search results may be returned including the ASR search results and the phonetic search results.

Other or different sequences of operations may be performed.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for searching an audio recording using text, the method comprising:

converting a text search query to a phonetic representation;

searching over an automatic speech recognition (ASR) index created for an audio file using the text search query to produce ASR search results wherein the ASR index comprises textual representations, each textual representation associated with a confidence score;

for one or more words in the ASR search results associated with a confidence score below a threshold, searching over a portion of the phonetic representation of the audio file using the phonetic representation of the text search query to produce phonetic search results; and returning as search results ASR search results and phonetic search results wherein the searching further comprises:

processing each word in an ASR index sequentially;

starting a new time segment to be used with phonetic processing when an ASR word is encountered with confidence below a threshold, wherein the new time segment start is based on at least one of: start time of the current low confidence ASR word, start or end time of the previous high confidence ASR word; start or end time of the N previous confidence words; and fixed time window added to or subtracted from any of the aforementioned values;

continuing processing each word in the ASR index and incrementing the phonetic portion until an ASR index word is found with a confidence score equal to or above the threshold or until the end of the ASR index is reached;

setting the end of the of the time sequence and adding a master list of media segments requiring a phonetic index; and continuing to process each word until the entire ASR index has been processed.

2. The method of claim 1, wherein the phonetic representation represents portions of the audio file corresponding to low confidence scores.

3. The method of claim 1 wherein the phonetic representation and ASR index are comprised within a composite index, and wherein the phonetic representation represents only portions of the audio file comprising words associated with a confidence score below the threshold.

4. The method of claim 1 wherein the phonetic representation and ASR index are comprised within a composite index, and wherein the phonetic representation represents portions of the audio file comprising words associated with a confidence score below the threshold and an overlap portion including words associated with a confidence score not below the threshold.

5. The method of claim 1, wherein the confidence score indicates the confidence that the word accurately represents the corresponding word in the audio recording.

6. The method of claim 3, wherein the search results comprise a location in the audio recording corresponding to the text search query.

7. A method for searching an audio recording using text, the method comprising:

searching over an automatic speech recognition (ASR) index created for an audio recording using a text search query to produce ASR search results, the ASR search results comprising words, each word associated with a confidence score;

for one or more words comprised in the ASR search results associated with a confidence score below a threshold, searching over a portion of the phonetic representation of the audio recording for the word associated with a confidence score below the threshold to produce phonetic search results; and returning as search results ASR search results and phonetic search results; the searching further comprising:

processing each word in the ASR index sequentially;

starting a new time segment to be used with phonetic processing when an ASR word is encountered with confidence below a threshold, wherein the new time segment start is based on at least one of: start time of the current low confidence ASR word, start or end time of the previous high confidence ASR word; start or end time of the N previous confidence words; and fixed time window added to or subtracted from any of the aforementioned values;

continuing processing each word in the ASR index and incrementing the phonetic portion until an ASR index word is found with a confidence score equal to or above the threshold or until the end of the ASR index is reached;

setting the end of the of the time sequence and adding a master list of media segments requiring a phonetic index; and continuing to process each word until the entire ASR index has been processed.

8. The method of claim 7, comprising searching over a phonetic representation of the audio file before the end of a preceding word and after the beginning of a subsequent word, to produce phonetic search results.

9. The method of claim 7 wherein the phonetic representation and ASR index are comprised within a composite index, and wherein the phonetic representation represents only portions of the audio file comprising words associated with a confidence score below the threshold.

10. The method of claim 7 wherein the phonetic representation and ASR index are comprised within a composite index, and wherein the phonetic representation represents portions of the audio file comprising words associated with a confidence score below the threshold and an overlap portion including words associated with a confidence score not below the threshold.

11. The method of claim 7, wherein the confidence score indicates the confidence that the word accurately represents the corresponding word in the audio recording.

12. The method of claim 7, wherein the search results comprise a location in the audio recording corresponding to the text search query.

13. The method of claim 7, wherein searching over the ASR index comprises:

converting the text search query to a phoneme representation; and using the phoneme representation to access a phoneme sequence lookup table, to return an index to the ASR index.

14. A system for searching an audio recording using text, the system comprising:

a memory; and a controller configured to:

search over an automatic speech recognition (ASR) index created for an audio recording using a text search query to produce ASR search results, the ASR search results comprising words, each word associated with a confidence score;

for one or more words comprised in the ASR search results associated with a confidence score below a threshold, search over a portion of the phonetic representation of the audio recording for the word associated with a confidence score below the threshold to produce phonetic search results; and return as search results ASR search results and phonetic search results; the searching further comprising:

processing each word in the ASR index sequentially;

starting a new time segment to be used with phonetic processing when an ASR word is encountered with confidence below a threshold, wherein the new time segment start is based on at least one of: start time of the current low confidence ASR word, start or end time of the previous high confidence ASR word; start or end time of the N previous confidence words; and fixed time window added to or subtracted from any of the aforementioned values;

continuing processing each word in the ASR index and incrementing the phonetic portion until an ASR index word is found with a confidence score equal to or above the threshold or until the end of the ASR index is reached;

setting the end of the of the time sequence and adding a master list of media segments requiring a phonetic index; and continuing to process each word until the entire ASR index has been processed.

15. The system of claim 14, wherein the controller is configured to search over a phonetic representation of the audio file before the end of a preceding word and after the beginning of a subsequent word, to produce phonetic search results.

16. The system of claim 14 wherein the phonetic representation and ASR index are comprised within a composite index, and wherein the phonetic representation represents only portions of the audio file comprising words associated with a confidence score below the threshold.

17. The system of claim 14 wherein the phonetic representation and ASR index are comprised within a composite index, and wherein the phonetic representation represents portions of the audio file comprising words associated with a confidence score below the threshold and an overlap portion including words associated with a confidence score not below the threshold.

18. The system of claim 14, wherein the confidence score indicates the confidence that the word accurately represents the corresponding word in the audio recording.

19. The system of claim 14, wherein the search results comprise a location in the audio recording corresponding to the text search query.

20. The system of claim 14, wherein searching over the ASR index comprises:

converting the text search query to a phoneme representation; and using the phoneme representation to access a phoneme sequence lookup table, to return an index to the ASR index.

* * * * *